United States Patent
Maes et al.

(10) Patent No.: US 7,454,621 B2
(45) Date of Patent: Nov. 18, 2008

(54) PROCESSING COPY PROTECTION SIGNALS

(75) Inventors: Maurice Jerome Justin Jean-Baptiste Maes, Eindhoven (NL); Antonius Adriaan Maria Staring, Eindhoven (NL); Johan Cornelis Talstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 742 days.

(21) Appl. No.: 10/257,203

(22) PCT Filed: Feb. 1, 2002

(86) PCT No.: PCT/IB02/00351

§ 371 (c)(1),
(2), (4) Date: Oct. 9, 2002

(87) PCT Pub. No.: WO02/065256

PCT Pub. Date: Aug. 22, 2002

(65) Prior Publication Data

US 2003/0056105 A1    Mar. 20, 2003

(30) Foreign Application Priority Data

Feb. 13, 2001   (EP)   ................................. 01200515

(51) Int. Cl.
*G06F 21/00*   (2006.01)
*G06F 21/22*   (2006.01)

(52) U.S. Cl. ....................... 713/176; 380/201; 380/203; 713/502

(58) Field of Classification Search ................... 320/201
See application file for complete search history.

(56) References Cited

U.S. PATENT DOCUMENTS

| | | | | |
|---|---|---|---|---|
| 5,450,248 | A | * | 9/1995 | Van Eijck et al. .............. 360/32 |
| 5,949,885 | A | | 9/1999 | Leighton |
| 6,310,956 | B1 | * | 10/2001 | Morito et al. ................ 380/201 |

(Continued)

FOREIGN PATENT DOCUMENTS

EP     0969462 A1    1/2000

OTHER PUBLICATIONS

Maes et al. "Digital Watermarking for DVD Video Copy Protection". IEEE Signal Processing Magazine. Sep. 2000. pp. 47-57.*

(Continued)

*Primary Examiner*—Ayaz Sheikh
*Assistant Examiner*—Saoussen Besrour

(57) ABSTRACT

The invention relates to a method and an arrangement for recording an information signal with first copy protection information to a storage medium using recording means, the recording being performed according to first copy rules identified by the first copy protection information. The method comprises the steps of detecting said first copy protection information identifying said first copy rules, recording at least second copy protection information according to said detected first copy rules, said first and at least second copy protection information identifying a legality message to be interpreted by reading means, the at least second copy protection information changing within a predefined time interval after the change in said detected first copy rules according to an interpreting rule.

16 Claims, 3 Drawing Sheets

U.S. PATENT DOCUMENTS

| | | | |
|---|---|---|---|
| 6,473,560 B1 * | 10/2002 | Linnartz et al. | 386/94 |
| 6,571,220 B1 * | 5/2003 | Ogino et al. | 705/51 |
| 6,633,723 B1 * | 10/2003 | Kuroda et al. | 386/94 |
| 6,740,875 B1 * | 5/2004 | Ishikawa et al. | 250/302 |
| 6,802,011 B1 * | 10/2004 | Ogino | 726/32 |
| 2002/0188567 A1 * | 12/2002 | Candelore | 705/51 |
| 2004/0103293 A1 * | 5/2004 | Ryan | 713/193 |
| 2005/0081042 A1 * | 4/2005 | Venkatesan et al. | 713/176 |

OTHER PUBLICATIONS

Maurice Maes et al; "Digital Watermarking for DVD", IEEE Signal Processing Magazine, pp. 48-57, 2000.

Cox I. J., et al; "Some General Methods for Tampering With Watermarks", IGGG Journal on Selected Areas in Communications, IEEE Inc, vol. 16, No. 4, pp. 587-593, XP000765117.

* cited by examiner

PROCESSING COPY PROTECTION SIGNALS

FIELD OF THE INVENTION

The invention relates to a method and arrangement for recording an information signal, the invention also relates to a method and arrangement for reading an information signal. The invention further relates to a device for recording and/or reading an information signal.

BACKGROUND OF THE INVENTION

With the advent of cheap digital IC-technology, two new methods have emerged for protecting multimedia content (video, audio, etc): encryption and watermarking. These tools are added to already existing ones like CGMS copy-bits for CD and video, and Macrovision spoiler signals for VCRs. Since these protection methods all have their particular strengths and weaknesses, they are or will be applied as a mixture in various combinations.

A watermark is an imperceptible label that is embedded/added to an information/host signal comprising multimedia content. The label may contain for instance copyright information, copy protection information, the name of the owner of the content. The information that may be stored in or derived on the basis of a watermark is usually referred to as a payload and is expressed in bits. In most watermark schemes the watermark is a pseudo-random noise sequence (pn-sequence), which is added to a host signal/information signal in either the time, spatial or a transformed domain (e.g. Fourier, Discrete Cosine or Wavelet Domain). Watermark detection is then usually based on a correlation between the watermark and the embedded host signal.

Watermarks are detected and decoded after the piece of content to which they pertain has been played/recorded, which poses interesting real-time problems. A number of popular copy-protection system architectures subscribe to the following axioms:

1. When recording from an analogue (unencrypted digital) source, if the incoming content has been watermarked copy once (CO), signifying that it may be copied once by this recorder, but no further copies of the first copy are allowed, this content shall be:
   (a) Remarked, i.e. a second watermark will be added signifying that it cannot be copied again: copy-no-more (CNM).
   (b) Encrypted before transferal to the storage medium (tape, optical or magnetic disk). E.g. working group 9 of the DVD-forum has mandated that copy-once content shall be encrypted whilst stored on disk. The 4C CPSA copy-protection architecture (Copy Protection for Recorded Media, by IBM, Intel, Matsushita, Toshiba) is another example.

Note that if the content is marked CO but has already been remarked (CNM) it will obviously not be recorded again.

2. Content watermarked as copy never (CN) or CNM shall not be recorded.
3. Content watermarked copy free (CF) or non-watermarked content, copy free in short (CF) shall be recorded without further encryption. This has not been formally agreed, but holds the status of a communis opinio.
4. In a player, the CNM and CN content should be encrypted on the record carrier. Unencrypted content with a CNM or CN watermark is therefore considered illegal. Thereby playback of media with illegal content is impossible, illegal content could be recorded by e.g. pirates using non-compliant recorders to dump watermarked content on a disk.
5. Watermarks only need to be checked in unencrypted content (playback and recording).

Recently a new category of content has been defined, called "Copy Free, no internet retransmission" (CFNIR): it can be copied freely within the home, but may not be retransmitted outside the home, for example via the Internet. It is to be treated as CO content, without the remark step. For such content the following axiom has been defined:

6. Content watermarked as "Copy Free, no internet retransmission" (CFNIR) may be recorded. This material shall be encrypted before transferal to the storage medium (tape, optical or magnetic disk).

Information in the watermarks regarding CNM, CN, CF and CO are interpreted and used as defined in the axioms when recording and playing back the content.

These described axioms should be able to deal with three types of recorders:

Compliant CO-enabled.

These types of recorders can make CO recordings.

Compliant not CO-enabled.

These type of recorders cannot record CO content, e.g. because they cannot remark or encrypt in accordance with axiom 1. The recorder has a watermark detector to recognize the CN or CO-status.

Non-compliant recorders.

These types of recorders are recorders modified by counterfeiters or legacy devices.

Watermark detection is a statistical process with the probability of successful detection depending heavily on things like the nature of the underlying content (lots of edges, high standard deviation etc.), signal to noise ratio (SNR) of the incoming signal, synchronization etc. The consequence is, that temporarily dropouts of the watermark might occur and during recording of CO content according to axiom 1 the encryption process will be interrupted.

This results not only in sub-optimal content protection, intermittent stretches of unencrypted content also pose a big threat to the consumer during playback. As mentioned in axiom 4 above, watermark detectors not only operate during the recording phase, but also during playback. Again because of the statistical nature of the detection process, it may very well happen that where the watermark detector in the recorder did not discern the CO watermark, the detector in the player does discern the CO watermark in one of the unencrypted stretches. Axiom 4 dictates that the player is obliged to interpret this as illegal because all CO content should be encrypted, and will cease playback. Although the probability of different watermark detector behavior in the recorder and the players is not large, with a large numbers of recorders and players on the market, it cannot be neglected.

A second related problem is that of a recorder of the type: Compliant not CO-enabled, trying to record CF content following CO content. Customarily the timer is set just before the end of the CO-segment, which the recorder cannot and does not want to copy. However when the desired show comes on, and the watermark vanishes the recorder does not know whether to interpret this as a watermark dropout or the beginning of the desired CF show, not having a watermark according to axiom 3.

A third related problem is that of a recorder of the type: Compliant CO-enabled, making a recording including CO content followed by CF content. This takes place because of two adjacent shows with different watermark status, but also because of a channel-change, e.g. on a set-top box. During the transition, two problems occur: first there is a latency in watermark detection, i.e. encryption/remarking gets turned off too late, and secondly again the watermark detector can not be sure whether the unwatermarked information signal presents a dropout or CF content.

It has been proposed to solve the above-mentioned problems by encrypting both CO and CF content. If CF content is also encrypted, watermark detection dropouts are trivially taken care of. Although some implementers in the SDMI arena have adopted this principle, it has as a major drawback that consumers need compliant software (i.e. containing decryption keys) even for processing content they produced themselves (e.g. editing home-videos requires licensed software). It is not clear whether the encryption-key licensing agent would want to make keys available for video-editing computer programs, potentially exposing vital secrets of the encryption system.

OBJECT AND SUMMARY OF THE INVENTION

It is an object of the invention to provide a method for solving the above-mentioned problems.

This is achieved by a method (and corresponding arrangement) of recording an information signal with first copy protection information to a storage medium using recording means, said recording being performed according to first copy rules identified by said first copy protection information, said method comprising the steps of:
- detecting said first copy protection information identifying said first copy rules,
- recording at least second copy protection information according to said detected first copy rules, said first and at least second copy protection information identifying a legality message to be interpreted by reading means, the at least second copy protection information changing within a predefined time interval after the change in said detected first copy rules according to an interpreting rule.

Preferred embodiments of the invention are defined in the sub claims.

The invention further relates to a method of reading an information signal comprising the steps of:
- detecting the presence of a legality message being interpreted from a first copy protection information and at least second copy protection information, said second having been added by recording means,
- determining the legality of the information signal according to the legality message, said legality message being ignored for a predetermined time interval before the legality of the information signal is determined.

The invention also relates to a device for recording or reading and information signal according to the above.

By the invention a method of recording information signal is obtained solving the problem of inconsistent copy protection signals. Introducing time delay/hysteresis, when recording the information signal and/or when a reader determines the legality of the information signal, solves this.

BRIEF DESCRIPTION OF THE DRAWINGS

In the following preferred embodiments of the invention will be described referring to the Figures, wherein.

DESCRIPTION OF PREFERRED EMBODIMENTS

In the following a description of the defined problem will be described referring to FIGS. 1-4. Followed by a description of preferred embodiments of the invention solving the defined problem.

In the embodiments described below the first copy protection information is a watermark identifying the copy rules CF (Copy Free), CFNIR (Copy Free No Internet Retransmission) or CO (Copy Once). The second copy protection information is an encrypted information signal or an unencrypted information signal and the third copy information is the presence of a watermark representing CNM (Copy No More).

Figure 1:
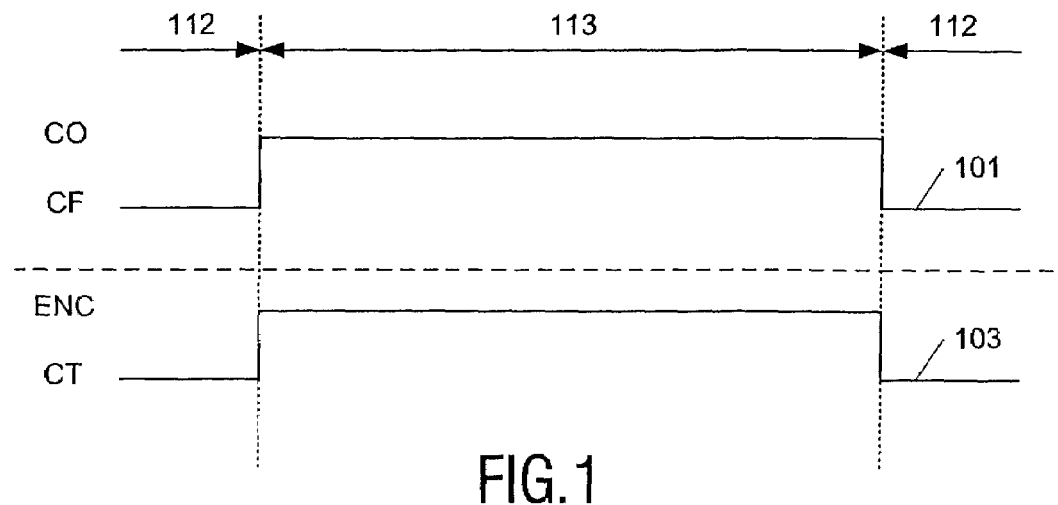
FIG. 1 illustrates the watermark information in an information signal.

FIG. 1 illustrates the watermark information 101 in an information signal, where some of the content 112 in the information signal has a watermark CF (Copy Free) and other content 113 have a watermark CO (Copy Once). The Figure also illustrates how the watermark information changes when the type of information in the information signal changes. According to axiom 1 described above when recording the information signal the CO content should be encrypted (ENC) and marked CNM (Copy No More), the CF content should remain clear text (CT) as shown by 103.

Figure 2:
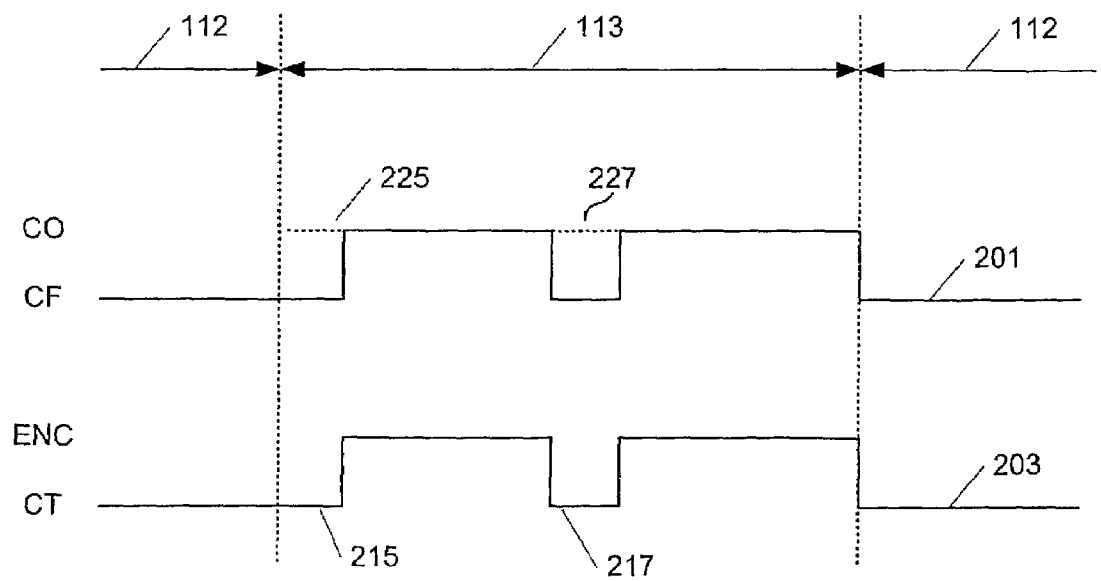
FIG. 2 illustrates real-time behavior of watermark detector and encryptor at recording of the signal in FIG. 1 with a watermark dropout.

FIG. 2 illustrates real-time behavior of watermark detector and encryptor at recording of the signal in FIG. 1 with a watermark dropout. A transition between CF content to CO content and back to CF content is shown, the CF content 112 could e.g. be news and the CO content 113 could be a movie. The watermark signal is illustrated at 201 and the encryption status of the recorded information signal is illustrated at 203. At 225 and 227 the watermark information should be detected as CO, but the watermark was detected as CF and thereby the information signal is not encrypted according to axiom 3. When a reader then reads the information it might not have dropouts at 225 and 227 whereby the information signal is considered illegal because of the combination of an unencrypted information signal and detected CO content.

Figure 3:
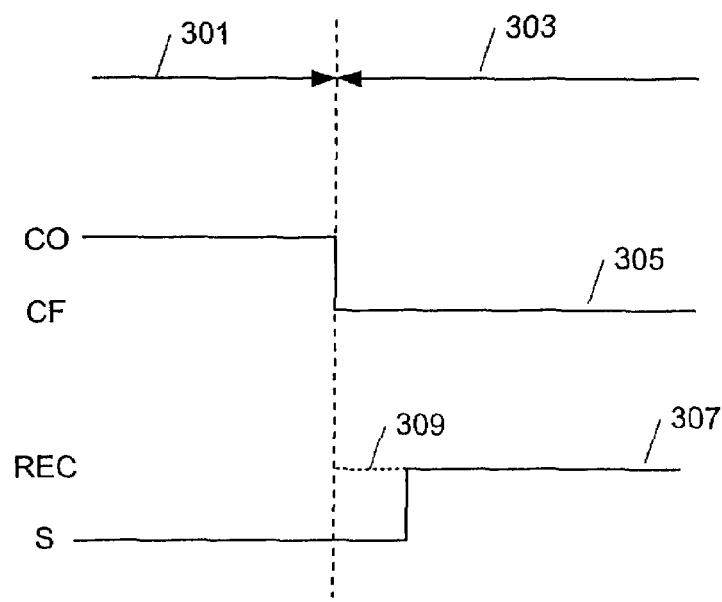
FIG. 3 illustrates real-time behavior of watermark detector and encryptor during a transition from CO to CF content in a non CO-enabled recorder.

FIG. 3 illustrates real-time behavior of watermark detector and encryptor during a transition from CO to CF content in a non CO-enabled recorder. A transition from CO content to CF content is shown, the CF content 303 could e.g. be news and the CO content 301 could be a movie. The watermark signal 305 is either CO or CF and the recording status 307 is either recording (REC) or stopped (S). The recorder should start recording when the watermark changes to CF. If the detection of the watermark information is delayed because of the time required to perform watermark detection, recording is started too late and the beginning 309 of the CF content 303 is not recorded.

Figure 4:
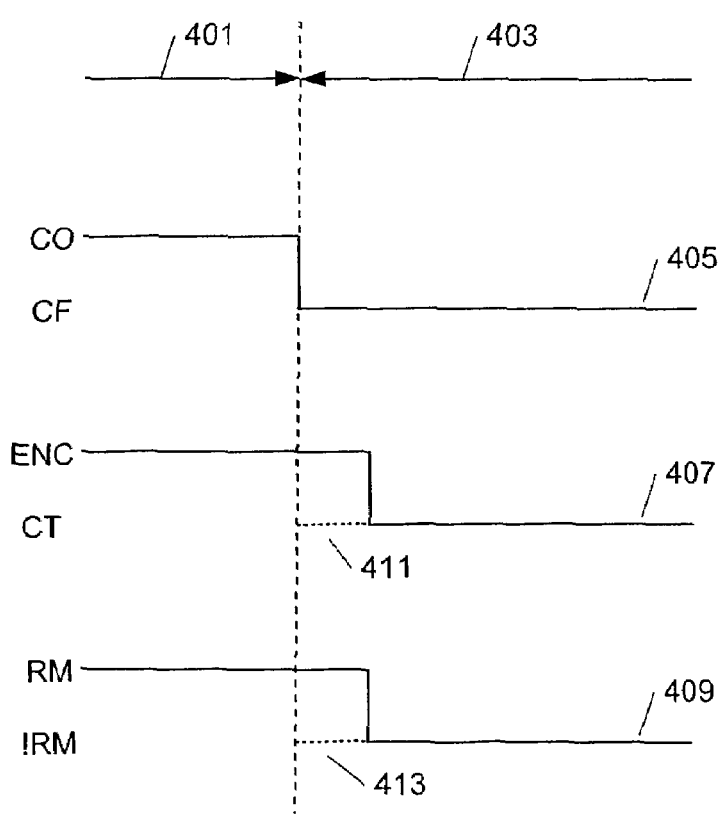
FIG. 4 illustrates real-time behavior of watermark detector and encryptor during a transition from CO to CF content in a CO-enabled recorder.

FIG. 4 illustrates real-time behavior of watermark detector and encryptor during a transition from CO to CF content in a CO-enabled recorder. A transition from CO content to CF content is shown, the CF content 403 could e.g. be news and the CO content 401 could be a movie. The watermark signal 405 is either CO or CF, encryption status 407 is either encrypted (ENC) or Clear Text (CT) and the remarking status 409 is either remarked (RM) or not remarked (!RM). When the CO-enabled recorder records the information signal according to axiom 1, the CO material is remarked and because of the time required to perform watermark detection either the remarking status or encryption status is changed too late.

Introducing hysteresis can solve all of the above dropout and watermark detection delay problems. According to the invention either a recorder keeps encrypting during a predefined time interval after a copy once watermark is fallen away and/or a reader with a watermark detector consider unencrypted content with a watermark as legal within a second time interval, hence the reader ignores the previously described axiom 4 within the second time interval.

Figure 5:
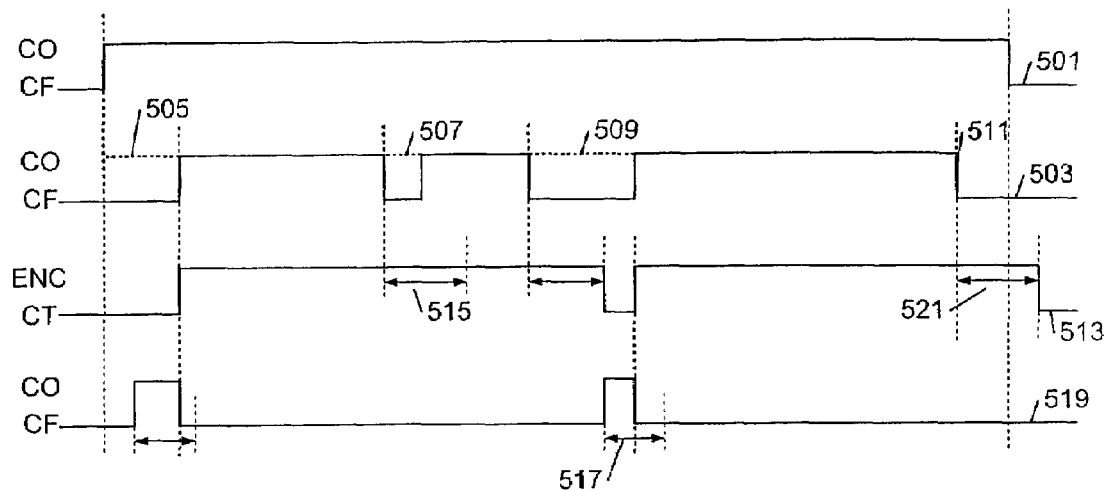
FIG. 5 illustrates the functionality of a recorder and a reader when using hysteresis.

FIG. 5 illustrates the functionality of a recorder and a reader when using hysteresis. The watermark status 501 of an information signal is CO within a time interval and CF outside the interval. The recorder detects the watermark status of the information signal as shown by 503 and the watermark status is wrongly detected as CF instead of CO four times 505, 507, 509, 511. According to axiom 1 the recorder should stop encrypting the information signal (change encryption status) when the detected watermark changes from a CO watermark to a CF watermark. The encryption status of the information signal is shown as 513, because of the predefined time interval 515, stopping encryption of the information signal, resulting from a wrongly detected watermark status 507, is avoided.

It should be noticed that because of the recorder hysteresis, CF content, at the transition from CO to CF in the end of the CO watermarked part, is encrypted, but no longer than the predefined time interval 521.

Further the playback device or reader could also have a hysteresis, resulting in axiom 4 being ignored for a predefined time interval. The read detection 519 is illustrated in FIG. 5, when axiom 4 is not fulfilled the encryption status is ignored for a time interval 517 thereby if the encryption status of a watermarked information signal is detected as non-encrypted (Clear Text), the information signal is not considered illegal within the time interval 517.

Having hysteresis in both the recorder and the reader has 2 effects:
 1. The system can deal with dropouts for time intervals being the sum of the recorder hysteresis and the reader hysteresis.
 2. It also deals with a CF to CO change in the watermark of the information signal, the recorder might not detect this change as fast as the reader and the reader hysteresis might avoid that this faulty detection is interpreted.

By choosing the size of the time intervals in a judicious way the dropout- and watermark detection delay problem can at least be minimized and probably removed.

In a specific embodiment the recorder hysteresis is set to 0 minutes and only the reader hysteresis is used. Thereby no accidental encryption of CF content happens, but there might be some recorded CO content that has not been encrypted.

In an embodiment a bit in the payload of the watermark is reserved, when this bit is set it is interpreted as use of recorder hysteresis according to a specific rule and when not set the hysteresis should be set to zero. Thereby the hysteresis can be controlled according to specific parts of specific content in the information signal. If in the information signal there is content having different watermark status (a transition between two shows CO–>CF) the hysteresis is set to zero and it is avoided that the CF content is encrypted.

The specific rule to be used in connection with using hysteresis could e.g. be as follows:
 1. Keep encrypting for at least/no more than a defined time period.
 2. Stop encrypting within/not before a defined time period.
 3. Start encrypting within/not before a defined time period.

Rule 2 is especially advantageous for solving the problems described in accordance with FIG. 3 and FIG. 4.

The size of the time period used for hysteresis could be stored as additional information in the watermark payload. Thereby despite potentially numerous detection errors (dropouts), the recorder will know for how long it needs to keep encrypting irrespective of the watermark detection condition.

Improved detection dropout avoidance and watermark state transitions generally results in loss of payload bandwidth. Payload bandwidth may however be preserved, by Huffman encoding the information before adding it to the watermark payload since the probability distribution of the additional information to be stored in the watermark is far from uniform, in fact it peaks in the 1.5-2 hour range.

Figure 6:
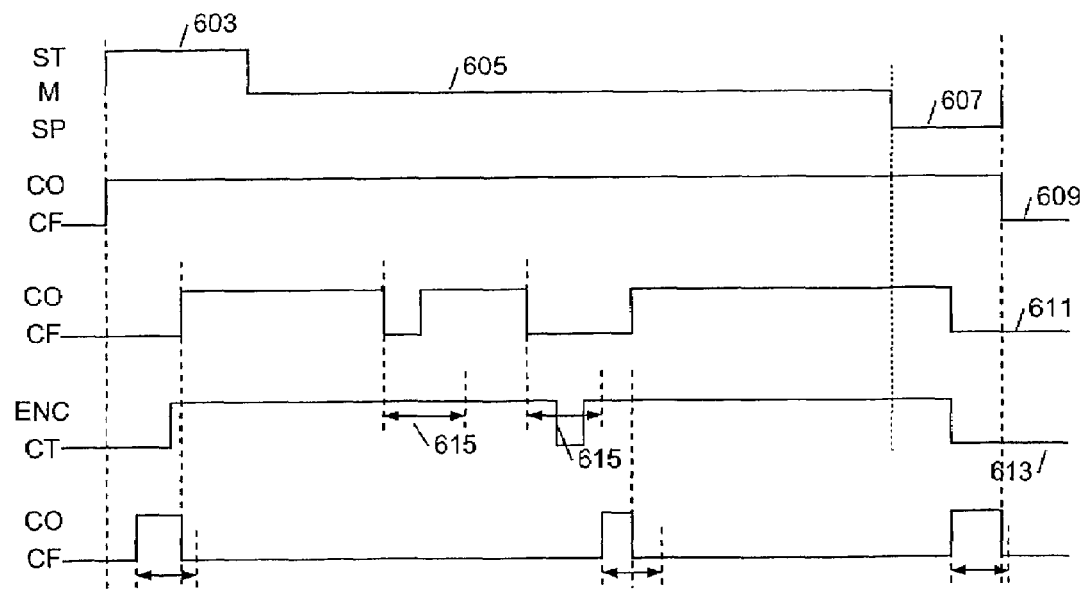
FIG. 6 illustrates another embodiment of a recorder and a reader when using hysteresis in combination with hysteresis status information.

FIG. 6 illustrates another embodiment of a recorder and a reader when using hysteresis. In this embodiment hysteresis is used in combination with information about where in a specific part of the information signal the detected watermark belongs (referred to as hysteresis information status). A specific part could be a show and where in the part could e.g. be the beginning of the show, the middle of the show and the ending the show. This hysteresis status information is placed in the watermark payload. In FIG. 6 the interpretation of this hysteresis status information 603 is shown, defining a start of show (ST) 605, middle of show (M) 607 and end of show (E). The status information is used for hysteresis control; the recorder should e.g. only use hysteresis in the middle of a show and not in the end of a show.

The watermark status 609 of an information signal is CO within a time interval and CF outside the interval. The recorder detects the watermark status of the information signal as shown by 611. According to axiom 1 the recorder should stop encrypting (change encryption status) when the detected watermark changes from a CO watermark to a CF watermark. The encryption status of the information signal is shown as 613, because of the predefined time interval 615, stopping encryption of the information signal, resulting from a wrongly detected watermark status, is avoided. It should be noticed that because of the hysteresis status information, the CF content, at the transition from CO to CF in the end of the CO watermarked part, is not encrypted.

In a specific embodiment of the invention the payload of the watermark contains two packets, which also can be used for hysteresis control according to the above. A first packet stating the duration of a specific part of the information signal, this could e.g. be used with a specific granularity, such as 5 min. slots. A second part states how far into a specific part of the information signal we are. In an embodiment packets of the first type should be broadcasted continuously, because the recorder may miss the beginning of the specific part, or the detector may have performed sub-par in the beginning. Though obviously packets of the first type do not have to be broadcasted as often as packets of the second type. A further advantage is when a specific part of information (a movie) has been interrupted by another part (commercial), the recorder can resynchronize using the received second type of packets.

A further method of getting information to be used for hysteresis control could be by using information from a PDC/VPS control signal. PDC/VPS is the name of the signals, which the broadcaster includes with the television programming, to inform VCRs of the delay of programs. The information in these bits is, one way or another, equivalent to "a program has just started" or "a program is about to begin/end".

In a specific embodiment of adding information to the watermark as described above, the information should only be communicated at regular intervals. This should be done since the watermark payload is a very low bandwidth channel.

The invention claimed is:

1. A method of recording an information signal with first copy protection information to a storage medium using recording means, said recording being performed according to first copy rules identified by said first copy protection information, said method comprising the steps of:
  detecting said first copy protection information identifying said first copy rules,
  recording at least second copy protection information according to said detected first copy rules, said first and at least second copy protection information identifying a legality message to be interpreted by reading means, the at least second copy protection information not changing in the recording until a predefined time interval greater than zero seconds after the change in said detected and recorded first copy rules according to an interpreting rule.

2. A method according to claim 1, wherein said second copy protection information is recorded in combination with third copy protection information according to said detected first copy rules, said combination of second and third copy protection information together with said first copy protection information identifying said legality message to be interpreted by said reading means, the combination of said second and third copy protection information not changing in the recording until a predefined time interval greater than zero seconds after the change in said detected and recorded first copy rules according to an interpreting rule.

3. A method according to claim 2, wherein the first copy protection information is a first watermark and wherein the second copy information is either an encrypted information signal or an unencrypted information signal, the encryption of said information signal being performed using a first encryption process having a first predefined level of security and wherein the third copy information is a second watermark.

4. A method according to claim 3, wherein information about the interpreting rule is placed in the payload of said first watermark.

5. A method according to claim 3, wherein the interpreting rule is that the encryption status of the information signal will not change in the time interval.

6. A method according to claim 3, wherein the interpreting rule is that the encryption status of the information signal will change after the time interval.

7. A method according to claim 3, wherein a value of the time interval is also placed in the payload of said first watermark.

8. A method according to claim 3, wherein location information is placed in the payload of the second watermark, the location information identifying where in a specific part of the information signal, the first watermark information pertains.

9. A method according to claim 8, wherein the location information identifies predefined places in the specific part of the information signal.

10. A method according to claim 8, wherein the location information is obtained from received information of a duration of said specific part and received information of a current time location in said specific part.

11. A method according to claim 4, wherein the payload is changed at predefined time intervals.

12. A method of reading an information signal comprising the steps of:
  detecting the presence of a legality message being interpreted from a first copy protection information and at least second copy protection information, said second copy protection information having been added by recording means,
  determining the legality of the information signal according to the legality message, said legality message being ignored after the determining for a predetermined time interval greater than zero seconds during reading that is independent of the detecting and determining steps before the legality of the information signal is determined, wherein the legality message is interpreted from a combination of second and third copy protection information, said second and third copy protection information having been added by recording means and wherein the first copy protection information is a first watermark and wherein the second copy information is either an encrypted information signal or an unencrypted information signal, the encryption of said information signal being performed using a first encryption process having a first predefined level of security and wherein the third copy information is a second watermark.

13. An arrangement stored on a machine readable medium for recording an information signal with first copy protection information to a storage medium using recording means, said recording being performed according to first copy rules identified by said first copy protection information, said arrangement comprising:
  means for detecting said first copy protection information identifying said first copy rules,
  means for recording at least second copy protection information according to said detected first copy rules, said first and at least second copy protection information identifying a legality message to be interpreted by reading means, the at least second copy protection information not changing in the recording until a predefined time interval greater than zero seconds after the change in said detected and recorded first copy rules according to an interpreting rule.

14. An arrangement stored on a machine readable medium for reading an information signal comprising:
  means for detecting the presence of a legality message being interpreted from a first copy protection information and at least second copy protection information, said second copy protection information having been added by recording means,
  means for determining the legality of the information signal according to the legality message, said legality message being ignored after the determining for a predetermined time interval greater than zero seconds during reading that is independent of the means for detecting and the means for determining before the legality of the information signal is determined, wherein the legality message is interpreted from a combination of second and third copy protection information, said second and third copy protection information having been added by recording means and wherein the first copy protection information is a first watermark and wherein the second copy information is either an encrypted information signal or an unencrypted information signal, the encryption of said information signal being performed using a first encryption process having a first predefined level of security and wherein the third copy information is a second watermark.

15. A device for recording or reading an information signal, the device comprising an arrangement for influencing recording according to claim 13.

16. A device for reading an information signal, the device comprising an arrangement for influencing playback according to claim 14.

* * * * *